United States Patent [19]

Hara et al.

[11] 4,372,660

[45] Feb. 8, 1983

[54] FILM UNIT CONTAINING PACK

[75] Inventors: Yoshio Hara, Minami-ashigara; Tadayoshi Shibata, Kanagawa, both of Japan

[73] Assignee: Fuji Photo Film Co., Ltd., Kanagawa, Japan

[21] Appl. No.: 258,493

[22] Filed: Apr. 28, 1981

[30] Foreign Application Priority Data

Apr. 28, 1980 [JP] Japan ................................. 55-56427

[51] Int. Cl.³ ...................... G03B 17/26; G03B 17/52
[52] U.S. Cl. .................................... 354/180; 354/86; 354/304
[58] Field of Search ................. 354/304, 174, 180, 86; 430/499

[56] References Cited

U.S. PATENT DOCUMENTS 3,832,731  8/1974  Kinsman ............................ 354/304

Primary Examiner—John Gonzales

Attorney, Agent, or Firm—Sughrue, Mion, Zinn, Macpeak and Seas

[57] ABSTRACT

A film unit containing pack for use with an instant camera of the type in which a plurality of film units are piled one on another within the pack and the film units, once exposed, are fed between a pair of developing rollers including a master roller and a slave roller. An edge of an outlet in the film pack through which the film units are pulled by the camera has a level difference in a range of −0.15 mm to +0.35 mm with respect to the level of an outer wall of the master roller which is closest to an outer wall of the slave roller. Also, the opening width of the outlet is preferably in a range of substantially 1.2 mm to 1.6 mm. Both ends of the edge of the outlet merge with slopes the gradient of each of which is in a range of substantially 1/25 to 1/12 wherein the degree or amount of contact between the edge and the surfaces of the film unit gradually decreases towards edge portions of the film unit.

3 Claims, 6 Drawing Figures

FILM UNIT CONTAINING PACK

BACKGROUND OF THE INVENTION

The present invention relates to a pack for loading a plurality of so-called "instant photographing films" (self-processing film units which are hereinafter referred to merely as "units" when applicable) piled one on another for use in an instant camera. More particularly, the invention relates to a pack wherein exposed units can be successively pulled out of the pack while the developing solution in each unit (hereinafter referred to as "processing solution") is uniformly spread in a predetermined image forming region of the unit.

A product composed of the units and the pack of the general type referred to herein is commercially available, for instance, as instant film type No. PR-10 manufactured by Eastman Kodak Co. The arrangement of the essential components of the units and pack of this type is shown in FIGS. 1 and 2.

As shown in FIG. 1, the unit 10 includes a first flexible sheet 1 having an image receiving layer, a second flexible sheet 2 for assisting the uniform spreading of the processing solution over an image forming region 6 to a predetermined thickness, and a bonding member 3 which is an intermediate sheet or an adhesive tape. The bonding member 3 is interposed between the two sheets 1 and 2 to form them into one unit.

The first and second sheets 1 and 2 have a container 4 and a trap 5, respectively. The container 4 is adapted to hold the processing solution along the front edge of the unit and it is tearable so that, upon application of an external pressure higher than a certain value, the processing solution is spread between the sheets 1 and 2. The trap 5 is adapted to catch surplus processing solution which is discharged from the container 4. The trap 5 is provided along the rear edge of the unit.

Compared with the thickness of a portion of the unit formed by the sheets 1 and 2 and the bonding member 3, for instance, the thickness of the image forming region 6, the thickness of the container 4 or the trap 5 is relatively large, usually 1.3 to 1.5 mm.

The pack 20 is a relatively flat box-shaped case, as shown in FIG. 2. The pack 20 has an upper plate 21 in which an exposure opening 22 is formed and a front side plate 23 in which an elongated outlet 24 is formed so that the unit 10 can pass therethrough.

A plurality (usually ten) of units 10 piled one on another are inserted in the pack 20 with the container sides adjacent the outlet 24. The units 10 are supported by a leaf spring 25 in such a manner that they are depressed towards the opening 22 and the image forming region 6 of the uppermost unit 10 is in alignment with the opening 22.

The pack 20 containing the units 10 as described above is loaded in the camera. When the uppermost unit 10 is exposed, a pushing pawl (not shown) provided in the camera moves towards the exposure opening 22 in the direction of the arrow A from the rear side of the pack along a groove 26 formed in the pack 20 so that the top end of the pawl abuts against the rear edge of the uppermost unit 10 thereby to push a part of the uppermost unit 10 out of the outlet 24 of the pack 20.

When a part of the unit 10 including the container 4 and a part of the image forming region 6 is moved to the nip point of a pair of developing rollers 27 and 28 which form a part of the camera, the unit 10 is completely moved outside the pack 20 by the force of the pair of developing rollers 27 and 28 which rotate respectively counterclockwise and clockwise. As a result, the unit 10, guided at a predetermined angle $\theta$ (12° to 18°) slightly upwardly toward the photographed object by the rollers, is discharged from the camera.

As the unit 10 is pressurized by the developing rollers 27 and 28 continuously from the container 4 to the trap 5, the container 4 is burst and the processing solution is spread between the sheets 1 and 2 to perform developing in the image forming region 6.

Specific features of the arrangement of the outlet 24 of the pack 20 and the relative position of the outlet 24 and the pair of developing rollers 27 and 28 on the camera side will be described in more detail.

The pair of rollers 27 and 28 will be referred to as "a slave roller 27" and "a master roller 28". Each of the rollers has a diameter of about 9 to 10 mm and the rollers are arranged parallel to one another. The master roller 28 rotates counterclockwise on a fixed axis. The slave roller 27 is provided above the master roller 28 with a small gap $d$ between the two rollers. The slave roller 27 is rotated clockwise. Further, the slave roller 27 has a suspension device, namely, a spring 29 so that its axis is movable vertically. The two rollers 27 and 28 thus constructed are arranged in front of the outlet 24 of the pack 20 (on the left-hand side in FIG. 3).

The loading position of the pack 20 is set so that the outer surface 23a of the front plate 23 is about 6 mm away from the axis C of the master roller 28. A sloped surface 30 which inclines inwardly of the pack 20 is formed on the upper edge of the front side plate 23 which forms a part of the outlet 24 extending in the longitudinal direction of the outlet 24 so that the unit 10 can be smoothly moved out of the pack 20. The width D of the opening between the lower surface 21b of the upper plate 21 and the edge 31 which is the outer edge of the sloped surface 30 is set at about 1.4 mm.

The edge 31 of the outlet 24 is spaced about 0.35 mm away from the outer wall level B of the master roller in the opposite direction to the object. That is, there is a level difference E between the outer wall level B and the edge 31. The outer wall level B is the level of the generating line forming the cylindrical wall of the roller 28, which is the closest to the cylindrical wall of the slave roller 27 and is perpendicular to the exposure system optical axis of the camera.

Both ends of the edge 31 of the outlet 24 merge with slopes 32 each having a gradient of about 1/10 so that the degree of contact with the unit 10 gradually decreases towards the edge portions of the unit.

Due to ambient temperature variations when the units 10 are inserted in the pack 20 or developed, a variation in the number of the units 10 in the pack 20, or mechanical differences of the camera with which the pack are used, sometimes the processing solution is spread with a non-uniform thickness which is harmful to the quality of picture. Especially in the first and last units of the pack 20, non-uniform spreading can occur. A typical percentage of the processing solution spread variation is from 10% to 20%.

When non-uniform spreading occurs, the quantity of processing solution, which should be caught by the trap 5 of the unit 10, may be insufficient or there may be too much. Therefore, sometimes the processing solution may leak out of the unit 10 or may be spread in such a manner that the front of the processing solution is partially wavy in the widthwise direction of the unit 10 thus adversely affecting the picture density and the color balance.

SUMMARY OF THE INVENTION

The inventors have conducted intensive research and analysis to determine why the above-described problem occurs and have discovered that a major source of the problem is attributed to the arrangement of the outlet 24 of the pack 20 and to the relative position of the outlet 24 and the pair of developing rollers 27 and 28. The present invention is based on this discovery.

An object of the invention is to provide a relatively compact pack with which the above-described difficulties accompanying a conventional pack have been eliminated without modifying the construction of the camera.

The foregoing object and other objects of the invention have been achieved by the provision of a film unit containing pack for holding a plurality of film units piled one on another in an instant camera in which each of the film units once exposed is fed between a pair of developing rollers including a master roller and a slave roller each having an outside diameter of about 6 to 12 mm. The container of the film unit is burst by the force of the developing roller. While the processing solution from the container is being spread over an image forming region of the film unit, the film unit is discharged out of the camera through the developing rollers with a discharging angle of about 10° to 20° towards an object photographed. An edge of an outlet through which the film unit pulled out of the pack passes has a level difference ranging from −0.15 mm to +0.35 mm with respect to the level of the outer wall of the master roller which is the closest to the outer wall of the slave roller.

DESCRIPTION OF THE PREFERRED EMBODIMENTS

A preferred embodiment of a pack according to the invention will be described with reference to the accompanying drawings.

Figure 1:
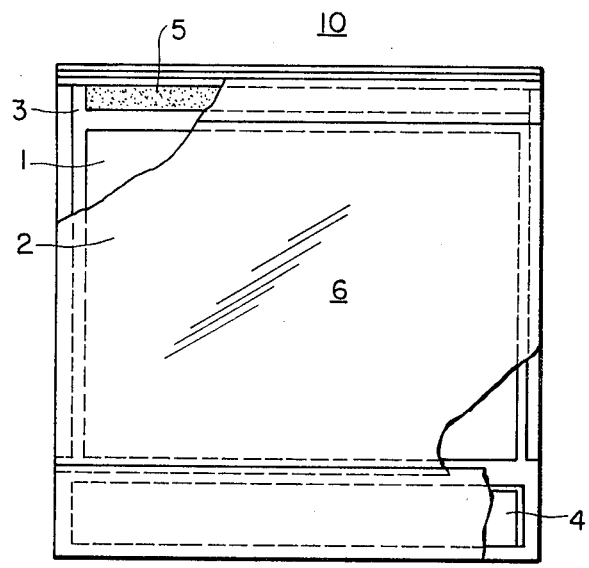
FIG. 1 is a plan view of a conventional "instant" film unit.
Figure 2:
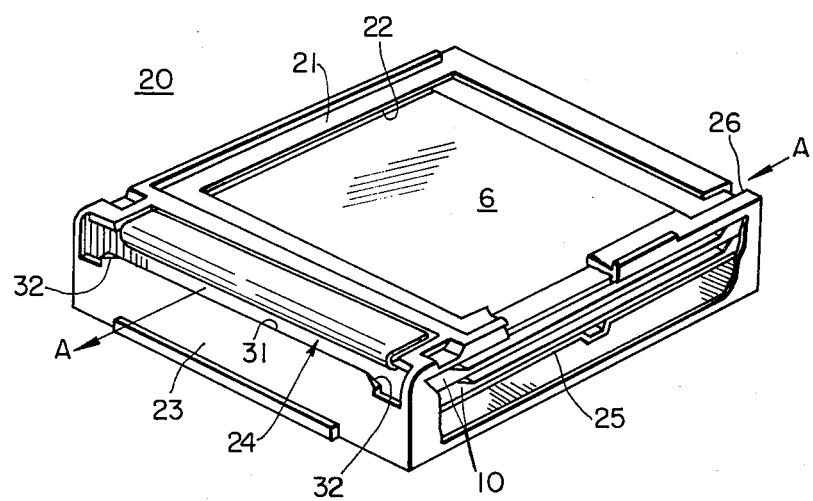
FIG. 2 is a perspective view of an "instant" film pack to which the invention is applied.
Figure 3:
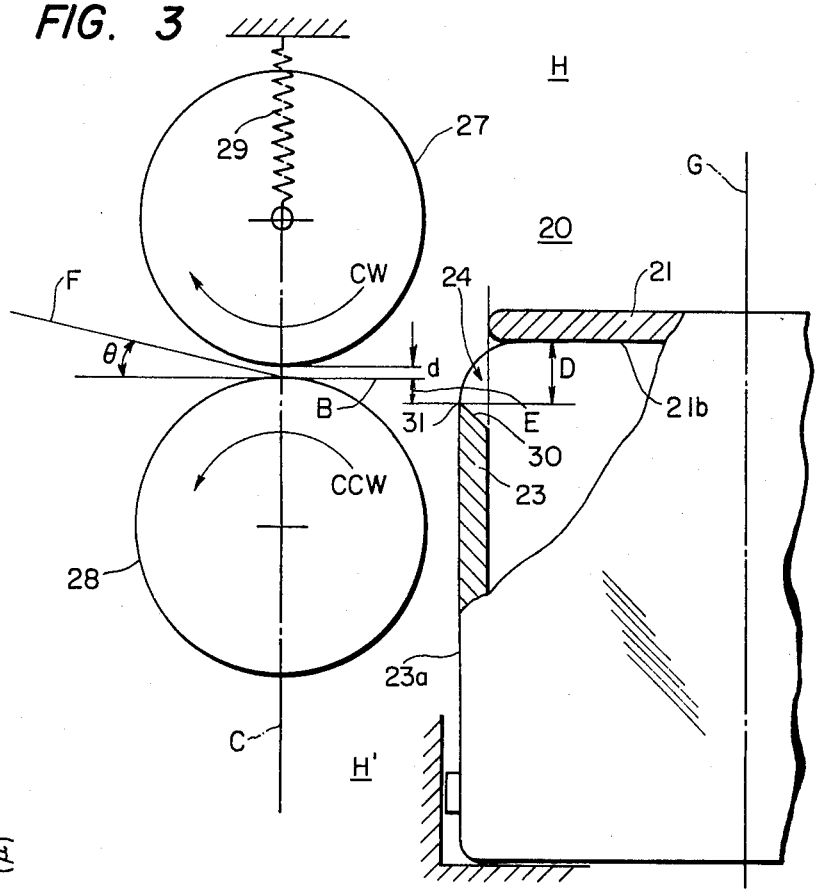
FIG. 3 is a side view showing positional relationships between the pack and a camera.

The arrangement of the pack of the invention is similar to that of the conventional pack described with reference to FIG. 1 through 3 except for its outlet and the portion around the outlet. With the arrangement of the pack of the invention, it is unnecessary to modify the conventional unit and the camera with which the pack is used at all. Therefore, a description of the various components of the pack which are unmodified will be omitted. The differences between the outlet and the portion around the outlet of the pack of the invention and those of the conventional pack will be mainly described.

Figure 4:
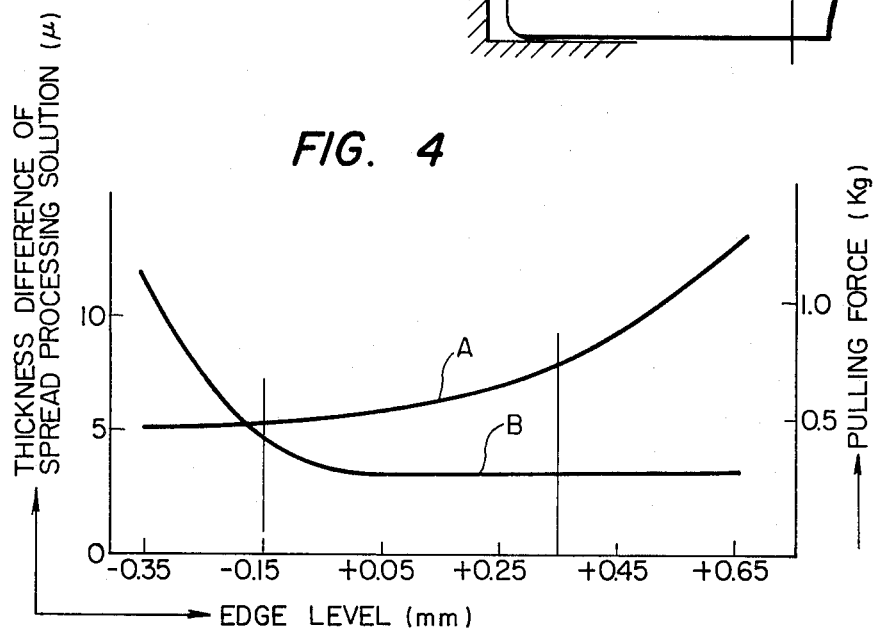
FIG. 4 is a graphical representation indicating the relationships between level differences and non-uniform spreading in a conventional pack and a pack according to the invention.
Figure 5:
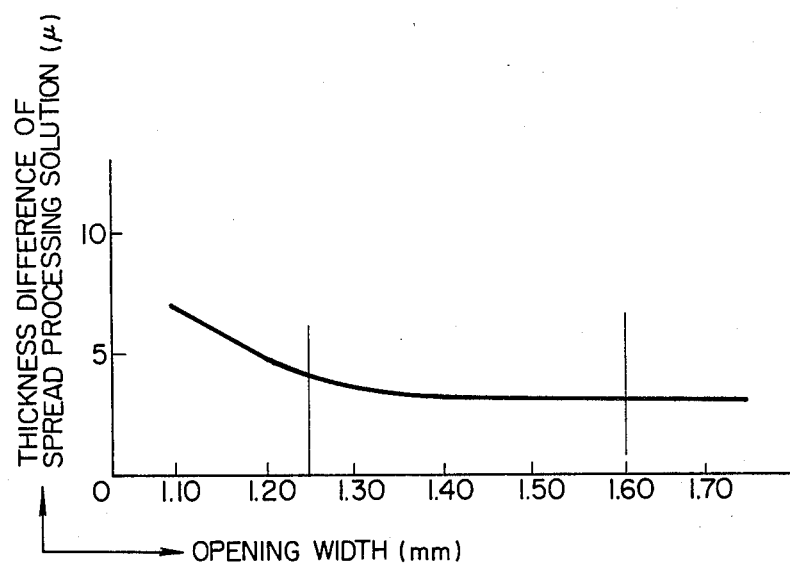
FIG. 5 is a graphical representation indicating the relationships between opening widths and non-uniform spreading in the conventional pack and the pack of the invention.

With reference to FIGS. 4 and 5, since the curves are for a pack, the Y-axis "thickness difference" refers to the difference in average spreading thickness of solution on the respective units in a single pack. Hence, given the previously identified problem of variations between units in a single pack, the difference is not of distribution of processing liquid solely on a single unit.

The pack of the invention differs from the conventional pack in the following points:

1. The edge 31 of the outlet 24 is so positioned that there is a step E formed between the edge 31 and the outer wall level B of the master roller which extends perpendicular to the exposure system optical axis G of the camera from the outer wall of the master roller 28 which is closest to the outer wall of the slave roller 27. The level difference of the step E ranges from 0.15 mm at the maximum in the direction H' opposite to the object to 0.35 mm at the maximum in the direction H to the object. That is, the level of the edge 31 is within −0.15 mm to +0.35 mm from the outer wall level B of the master roller 28.

2. The opening width D of the outlet 24 is in the range of 1.2 to 1.6 mm.

3. The gradient of each of the slopes 32 merging with both ends of the edge 31 is in the range of 1/25 to 1/12.

The pack of the invention, whose arrangement is similar to that of the conventional pack except for the above-described differences, has the following advantageous effects:

1. As the position E of the edge 31 is set in the range of −0.15 to +0.35 mm from the outer wall level B of the master roller 28, non-uniform spreading is limited to a thickness difference of about 5 μ. Such a small thickness difference will cause no problem in practical use as indicated by the curve B in FIG. 4.

As is apparent from the curve B in FIG. 4, even if the position of the edge 31 is set to more than +0.35 mm, the thickness difference can be maintained at about 3.5 μ. However, the pulling force or driving force of the pair of developing rollers 27 and 28 acting on the unit 10 abruptly increases as shown by the curve A in FIG. 4. That is, the energy necessary for driving the developing rollers 27 and 28 increases abruptly as the position of the edge 31 is increased from +0.35 mm. Accordingly, it is preferable that the level difference between the edge 31 and the outer wall level B of the master roller be in the range of −0.15 to +0.35 mm.

2. As the opening width D of the outlet 24 is in the range of 1.2 to 1.6 mm, non-uniform spreading can be maintained at a level which will cause no problem in practical use, as shown in the graph of FIG. 5, for photographing operation at low temperatures of, for instance, 0° C. It is undesirable to set the opening width D to more than 1.6 mm because sometimes two units 10 would then be pulled out simultaneously.

Figure 6:
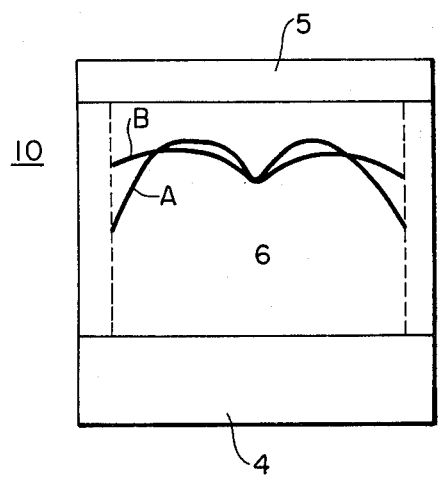
FIG. 6 is a plan view showing patterns of fronts of spread processing solutions by slopes merging with both ends of an edge of the pack in the conventional pack and the pack of the invention.

3. The gradient of each of the slopes 32 merging with the ends of the edge 31 is in the range of 1/25 to 1/12 as described above. As a result, as shown in FIG. 6, the pattern B of the front of the spread processing solution in the pack of the invention has less wavy irregularity than the pattern A of the front of the spread processing solution of the conventional pack. Accordingly, the total quantity of processing solution needed to erase the pattern of the front of the spread processing solution can be reduced. Accordingly, the surplus quantity of processing solution can be made smaller and the solution catching capacity of the trap 5 reduced.

Due to the mutual actions of the various features of the pack of the invention, the above-described advantageous effects of the pack of the invention are not degraded by changes in ambient temperature when the units are inserted into the pack or developed, the number of units remaining in the pack and the mechanical differences of the cameras in which the pack is used, and the stability of the pack is further improved. Especially, by positioning the edge 31 −0.15 to +0.35 mm from the outer wall level B, i.e., the position of the edge 31 with respect to the outer wall level B of the master roller 28 is higher than that in a conventional pack, the discharging path of the unit 10 is formed so that the winding angle of the unit 10 with respect to the slave roller 27 is larger than that of the conventional pack. This contributes greatly to the above-described advantageous effects of the invention.

The advantageous effects of the invention can be obtained even in an instant camera in which each of the pair of developing rollers 27 and 28 has a diameter of 6 to 12 mm and the unit discharging angle $\theta$ is 10° to 20°. In other words, the degree of freedom in design and the tolerance in finish dimensions of such a camera can be increased.

What is claimed is:

1. A film unit containing pack for holding a plurality of film units piled one on another for use with an instant camera in which each of said film units once exposed is fed between a pair of developing rollers including a master roller mounted on a fixed axis and a slave roller spring biased toward said master roller, each roller having an outside diameter in a range of substantially 6 to 12 mm, each of said film units having a processing solution holding container adapted to be burst by said developing roller means, and said camera and said pack being adapted such that processing solution contained in said container is spread over a predetermined image forming region of said film units while said film units is discharged out of said camera by said developing rollers with a discharging angle of 10° to 20° towards a front of said camera, the improvement comprising; said pack having a lower edge of an outlet through which said film unit is pulled out of said pack, said lower edge being located relative to the film unit opposite said image forming region thereon, formed to have a level difference in a range of −0.15 to +0.35 mm with respect to the level of an outer wall of said master roller which is closest to an outer wall of said slave roller, and said master roller located on the same side of said film unit as said lower edge.

2. The film unit containing pack as claimed in claim 1 wherein the opening width of said outlet is in a range of 1.2 mm to 1.6 mm.

3. The film unit containing pack as claimed in claim 1 or 2 wherein both ends of said lower edge of said outlet merge with slopes the gradient of each of which is in a range of substantially 1/25 to 1/12 wherein the degree of contact with said film unit gradually decreases towards edge portions of said film unit.

* * * * *